No. 650,884. Patented June 5, 1900.
R. T. WEAVER.
WATER FILTER.
(Application filed Mar. 9, 1900.)

(No Model.) 2 Sheets—Sheet 1.

No. 650,884. Patented June 5, 1900.
R. T. WEAVER.
WATER FILTER.
(Application filed Mar. 9, 1900.)
(No Model.) 2 Sheets—Sheet 2.
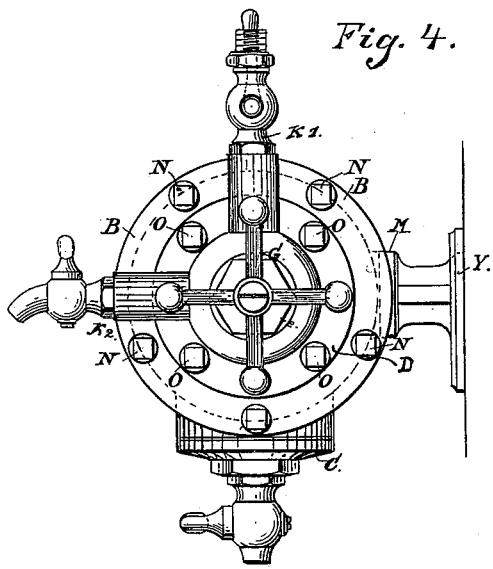
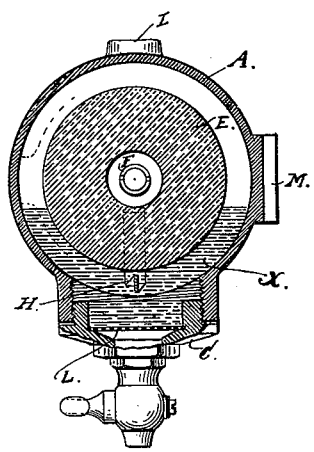
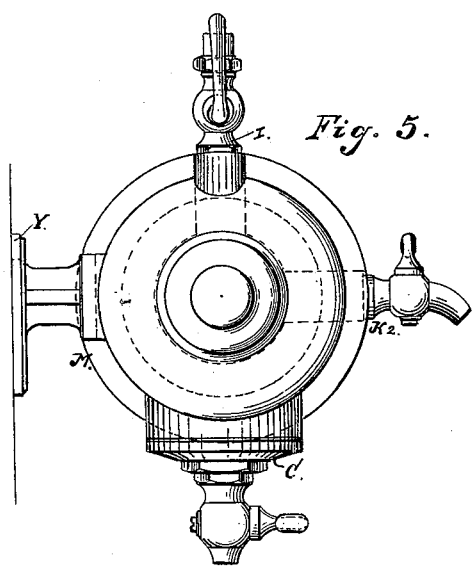
WITNESSES:
INVENTOR
Robert T. Weaver
BY
ATTORNEY

UNITED STATES PATENT OFFICE.

ROBERT T. WEAVER, OF NEW YORK, N. Y.

WATER-FILTER.

SPECIFICATION forming part of Letters Patent No. 650,884, dated June 5, 1900.

Application filed March 9, 1900. Serial No. 8,063. (No model.)

*To all whom it may concern:*

Be it known that I, ROBERT T. WEAVER, a citizen of the United States, and a resident of the city of New York, in the county of New York and State of New York, have invented certain new and useful Improvements in Domestic Water-Filters, of which the following is a specification.

Filters for domestic use wherein the filtering medium consists of porous stone or earthenware have been long known. In these filters the superficial area of the filtering-surface is small as compared with the quantity of water to be filtered. It is therefore of the first importance and a condition of practical success that the filtering-body be kept constantly in a condition of maximum efficiency—that is, that the filtering-surface be readily and thoroughly cleanable, so that the matter strained from the water may not accumulate upon and clog that surface. Many attempts to accomplish this result have been made, but with only partial or temporary success. Scouring-bars of emery or other abrading substance have been tried in which the bar is held in contact with the filtering-surface by gravity or spring-pressure, the cleansing being attempted by revolving the filtering-body against the scouring-bar from time to time while a reverse current of water is sent through the filter; but in practice it is found that the filtering-body soon wears out of shape, so that the contact between the scouring-bar and the filtering-surface becomes imperfect, parts of the filtering-surface being cleaned while other parts are not, and the efficiency of the filter constantly diminishes with use. The attempt to overcome this difficulty has been made by substituting granular material partly surrounding the filtering-body for the scouring-bar. To clean, the filtering-body is revolved, as before, while a reverse current of water is sent through the casing of the filtering-body. The theory is that the granular material will thus scour the filtering-surface, while at the same time the current of water will so agitate the particles of the granular material as to clean them by attrition one against the other and rearrange them in the filter-case when the cleansing operation is suspended; but practice has shown that the current of water alone is insufficient to accomplish this result. The granular material soon becomes compacted and thereafter is not stirred up nor agitated, cleansed, and rearranged in the filter-case, as is essential to the best results. My invention is intended to overcome these difficulties; and it consists, mainly, in the addition of a stirring or cutting device, which is attached to the filtering-body, revolves with it during the cleansing operation, and cuts through and thoroughly breaks up and agitates and rearranges the granular material in the filter-case when it is allowed again to settle.

In the drawings forming part of this specification, Figure 1 is a longitudinal sectional view of my filter. Fig. 2 is an exterior view of the same. Fig. 3 is a screen covering the scouring-outlet C to prevent the escape of the granular material. Fig. 4 is a view of the handle end of my filter. Fig. 5 is a view of the other end. Fig. 6 is a cross-sectional view showing the interior arrangement of the parts, and Fig. 7 shows an arrangement for mounting the filter on a shelf or similar locality.

In the drawings, A represents the filter-case, provided with the inlet I for unfiltered water, the outlet for the filtered water at K' and K², and the cleansing-outlet C.

B is a water-tight head closing one end of the filter-case A, to which it is secured by the bolts N N. (See Fig. 4.)

D is the filtered-water chamber, attached to the head B by the bolts O O, (see Fig. 4,) with which it makes a water-tight connection by means of an interposed gasket or other suitable packing and to which are attached the filtered-water outlets K' and K².

E is the filtering-body, of porous stone or earthenware, secured in the usual or any other convenient way to the hollow shaft F, with which it revolves in the cleansing operation on turning the handle G. The filtering-body E is in the form of a hollow cylinder, and the hollow shaft F is provided with perforations, as shown at c, Fig. 1. The shaft F is provided with the stuffing-boxes e e to prevent leakage into the water-chamber D or escape of water therefrom except by the outlets K' and K².

H is a stirring or cutting bar attached to the filtering-body E in such a way as to revolve with it. This bar where parallel with the axis of the filtering-body E is so spaced (see Figs. 1 and 6) as to be in contact neither with the filtering-body nor interior of the filter-case A. It may consist of a single bar of any cross-section, but is most efficient when made in the form of a flat bar twisted into a coarse spiral on its own axis, as shown in Fig. 1.

M is any convenient form of projection or socket upon the exterior of the filter-case, by which the filter may be fastened to a wall, as shown in Figs. 4 and 5, or slipped upon a standard attached to a shelf, as shown at II in Fig. 7.

C is the outlet used and only used when the filter is being cleaned. Its channel of communication with the interior of the filter-case is covered by the screen L to retain the granular material within the filter-case when the discharge C is opened.

X is the scouring material, which may consist of almost any hard granular matter, though I prefer quartz crushed fine enough to pass a twenty-four-mesh sieve and coarse enough not to pass a thirty-six-mesh sieve. I have discovered that if the granules of the scouring material are of uniform size the wear on the surface of the filtering-body is much more even than when they are irregular in this respect.

My filter is designed to be used in a horizontal position, and it is desirable to have the interior of the casing drain toward C, as shown in Fig. 2.

My filter operates as follows: The water to be filtered enters at I, Fig. 1, passes through the porous filtering-body E, being strained at its surface, into its axial hollow, whence it escapes by the openings $c$ into the hollow shaft or tube F, thence by the opening $c'$ into the filtered-water chamber D, and passes either into a storage-reservoir through the outlet K' or through a faucet K² for immediate use, as may be desired.

When cleaning becomes desirable, the filtered-water outlets K' and K² are closed and the cleaning-outlet C is opened. The water then flows in at I and out at C. At the same time the filtering-body E is rotated upon its axis by means of the handle G, carrying the cutting or stirring bar H with it. Thus the surface of the filtering-body E is scoured by the attrition of the scouring material X, while the stirring or cutting bar thoroughly agitates the scouring material, so that its particles are in turn scoured by their attrition against one another and the dirty matter which was upon the surface of the filtering-body is thrown into the water and carried away through the discharge C. In two or three minutes the operation is complete, when the discharge C is closed, the filtered-water outlet K' or K² is opened, and the filter is again in operation.

When the filtering-body E is so worn as to require renewal, the bolts N N are released, when the head B and all the parts connected thereto, including the hollow shaft F, the filtering-body E, and the water-chamber D, may be removed as a unit. Then by the removal of the screw-nut $b$, Fig. 1, the old filtering-body may be withdrawn from the hollow shaft F and a new one readily substituted and replaced in operative position without disturbing any of the other parts.

Having thus described my invention, what I claim as new, and desire to patent, is—

1. In a water-filter, a casing, a cylindrical filtering-body revoluble within said casing, scouring material partially filling the space between the filtering-body and the casing, and a stirring or cutting bar attached to and revolving with said filtering-body, substantially as and for the purpose set forth.

2. In a water-filter, a casing, a cylindrical filtering-body revoluble within said casing, scouring material partially filling the space between the filtering-body and the casing, and a stirring or cutting bar attached to and revolving with said filtering-body, that portion of said stirring or cutting bar which is parallel to the surface of the filtering-body being twisted on its own axis into a spiral form.

3. In a water-filter, a casing, a cylindrical filtering-body revoluble within said casing, granular scouring material having its granules of practically-uniform size partially filling the space between the filtering-body and the casing, and a stirring or cutting bar attached to and revolving with said filtering-body, substantially as and for the purpose set forth.

4. In a water-filter, a head B, a water-chamber D, a hollow shaft F and a filtering-body E, the whole so combined that by removing the head B, the parts named may be simultaneously separated as a unit from the filter-casing.

Signed at the city of New York, in the county of New York and State of New York, this 7th day of March, A. D. 1900.

ROBERT T. WEAVER.

Witnesses:
EDWARD C. DAVIDSON,
I. L. PERRY.